US008222366B2

(12) United States Patent
Ryu et al.

(10) Patent No.: US 8,222,366 B2
(45) Date of Patent: Jul. 17, 2012

(54) POLYTHIOURETHANE POLYMERIZABLE COMPOSITION AND METHOD FOR PRODUCING OPTICAL RESIN BY USING SAME

(75) Inventors: Akinori Ryu, Arao (JP); Mamoru Tanaka, Omuta (JP); Osamu Kohgo, Omuta (JP); Kunio Okumura, Mobara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 28 days.

(21) Appl. No.: 11/918,209

(22) PCT Filed: Apr. 10, 2006

(86) PCT No.: PCT/JP2006/307554
§ 371 (c)(1),
(2), (4) Date: Oct. 11, 2007

(87) PCT Pub. No.: WO2006/109765
PCT Pub. Date: Oct. 19, 2006

(65) Prior Publication Data
US 2009/0030170 A1    Jan. 29, 2009

(30) Foreign Application Priority Data

Apr. 11, 2005  (JP) ................................ 2005-113653
Sep. 9, 2005   (JP) ................................ 2005-262168

(51) Int. Cl.
*C08G 18/00* (2006.01)
(52) U.S. Cl. ................ 528/76; 528/73; 528/65; 528/59; 528/373; 528/374; 428/423.1
(58) Field of Classification Search .................. 528/374, 528/373, 59, 65, 73, 76, 67, 375; 351/159; 428/423.1; 359/642
See application file for complete search history.

(56) References Cited

U.S. PATENT DOCUMENTS

| 5,059,673 | A |   | 10/1991 | Kanemura et al. |
| 5,294,666 | A | * | 3/1994  | Okada et al. ............. 524/609 |
| 5,310,847 | A |   | 5/1994  | Yean et al. |
| 5,679,756 | A | * | 10/1997 | Zhu et al. ............... 528/65 |
| 5,908,876 | A |   | 6/1999  | Fujii et al. |
| 6,770,735 | B2| * | 8/2004  | Tanaka et al. ........... 528/374 |
| 2003/0199668 | A1 | * | 10/2003 | Tanaka et al. ......... 528/374 |
| 2005/0215757 | A1 |   | 9/2005  | Kobayashi et al. |
| 2006/0149018 | A1 | * | 7/2006  | Kitahara ................ 528/44 |
| 2006/0155093 | A1 |   | 7/2006  | Kitahara |
| 2010/0234552 | A1 |   | 9/2010  | Kitahara |

FOREIGN PATENT DOCUMENTS

| AU | 2004245407 A | 12/2004 |
| CN | 1596276 A | 3/2005 |
| JP | 02-270859 A | 11/1990 |
| JP | 03-124722 A | 5/1991 |
| JP | 07-68326 B2 | 7/1995 |
| JP | 07-252207 A | 10/1995 |
| JP | 11-043527 A | 2/1999 |
| JP | 2003-098301 A | 4/2003 |
| WO | WO 97/23529 A1 | 7/1997 |
| WO | WO 2004/108786 A1 | 12/2004 |
| WO | WO 2004/108787 A1 | 12/2004 |
| WO | WO 2004108787 A1 * | 12/2004 |

OTHER PUBLICATIONS

Office Action from Japanese Patent Office issued in corresponding Japanese Patent Application No. 2007-512994 dated Mar. 1, 2011.
Office Action issued in corresponding Australian Application No. 2006234477 dated Oct. 25, 2010.

* cited by examiner

*Primary Examiner* — Milton I Cano
*Assistant Examiner* — Michael L Leonard
(74) *Attorney, Agent, or Firm* — Buchanan Ingersoll & Rooney PC

(57) ABSTRACT

A resin composition excellent in tintability and resin strength, a resin obtained by curing such a resin composition, and an optical component is provided. A polymerizable composition containing an isocyanate compound suitably used for transparent resin materials, at least one polythiol compound which may have one or more (poly)sulfide bonds in a molecule, and at least one polyhydroxy compound having two or more hydroxy groups in a molecule and/or at least one (poly)hydroxy(poly)mercapto compound having one or more hydroxy groups and one or more thiol groups is used.

6 Claims, No Drawings

POLYTHIOURETHANE POLYMERIZABLE COMPOSITION AND METHOD FOR PRODUCING OPTICAL RESIN BY USING SAME

TECHNICAL FIELD

The present invention relates to a polymerizable composition, a resin and an optical component.

BACKGROUND ART

Since a plastic lens is lightweight and hardly broken as compared to an inorganic lens, and can be tinted, in late years, it has quickly come into wide use as an optical component of a spectacle lens, a camera lens and the like.

A spectacle lens has been required to have many functions such as (3) excellent heat resistance, (4) easy tintability, (5) resin strength capable of enduring processing and the like in addition to optical performance such as (1) high refractive index, (2) high Abbe's number. Various resin materials for lenses have hitherto been developed and used accordingly.

Of such materials, a polythiourethane resin has been developed as a representative example (refer to Patent Documents 1 and 2).

Furthermore, a polythiourethane resin using an isocyanate compound having a specific chemical structure is excellent in high refractive index, high Abbe's number, high heat resistance and impact resistance, and made into a plastic lens which is highly excellent in the balance thereof (refer to Patent Document 3).

On the other hand, in recent years, fashionability has been demanded in a spectacle lens so that a tinted lens has been increasingly demanded. When tintability is said to be good, the tinting temperature can be lowered and a load on a spectacle lens can be reduced. However, since tintability and heat resistance of a base material are in a tradeoff relationship, a lens having heat resistance without having any problem in practical use and excellent in tintability has been in demand. Furthermore, since fashionability is further pursued, a resin has been subjected to various processings. However, when resin strength is not sufficient, the resin might be broken upon processing or the yield rate becomes worsened. For that reason, resin strength has been demanded to be further improved.

As described above, a plastic lens has been exemplified, but in a polythiourethane resin, tintability and resin strength have been demanded to be improved.

Patent Document 1: Japanese Patent Laid-open No. 1990-270859

Patent Document 2: Japanese Patent Laid-open No. 1995-252207

Patent Document 3: Japanese Patent Laid-open No. 1991-124722

DISCLOSURE OF THE INVENTION

A problem of the present invention is to provide a composition giving a resin excellent in tintability and having sufficient resin strength as compared to a conventional resin.

In order to solve the above problem, the present inventors have conducted an extensive study and as a result, have found that a polythiourethane resin obtainable by polymerizing a polymerizable composition containing (A) an alicyclic isocyanate compound represented by the following formula (1) and/or formula (2), (B) an isocyanate compound containing at least one selected from a group of compounds in formula (3), formula (4) or formula (5), (C) at least one polythiol compound which may have one or more (poly)sulfide bonds in a molecule, and (D) at least one polyhydroxy compound having two or more hydroxy groups in a molecule and/or at least one (poly)hydroxy(poly)mercapto compound having one or more hydroxy groups and one or more thiol groups has fully satisfied the required physical properties. Thus, the present invention has been completed.

That is, the present invention relates to:

[1] a polymerizable composition containing (A) an alicyclic isocyanate compound represented by the following formula (1) and/or the following formula (2),

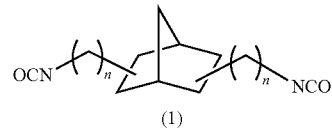

[Chem. 1]

(in the formula (1), n represents an integer equal to or larger than 0 and equal to or smaller than 3)

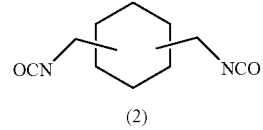

[Chem. 2]

(B) an isocyanate compound containing at least one selected from a group of compounds consisting of the following formula (3), the following formula (4) and the following formula (5), [Chem. 3]

$$OCN-(CH_2)m\text{-}NCO \quad (3)$$

(in the formula (3), m represents an integer equal to or larger than 2 and equal to or smaller than 10)

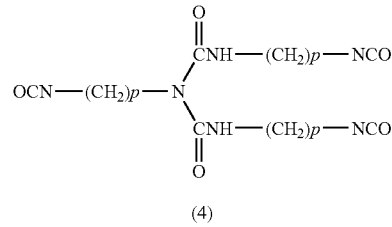

[Chem. 4]

(in the formula (4), p represents an integer equal to or larger than 2 and equal to or smaller than 10)

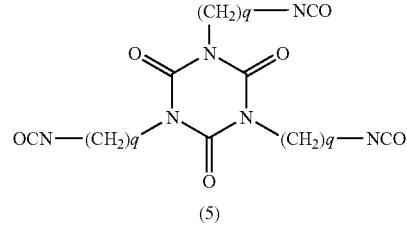

[Chem. 5]

(in the formula (5), q represents an integer equal to or larger than 2 and equal to or smaller than 10)

(C) at least one polythiol compound which may have one or more (poly)sulfide bonds in a molecule, and (D) at least one polyhydroxy compound having two or more hydroxy groups in a molecule and/or at least one (poly)hydroxy(poly)mercapto compound having one or more hydroxy groups and one or more thiol groups;

[2] the polymerizable composition as set forth in [1], wherein the (A) is an alicyclic isocyanate compound represented by the following formula (6) and/or the above formula (2), and

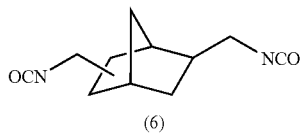

[Chem. 6]

(6)

the (B) is at least one isocyanate compound selected from a group of compounds consisting of the above formula (3) (m=6), the above formula (4) (p=6) and the above formula (5) (q=6);

[3] the polymerizable composition as set forth in [1] or [2], wherein 100×A/(A+B+C) is not less than 0.1% but not more than 40% when the mole numbers of the hydroxy group and the thiol group in the (D) polyhydroxy compound having two or more hydroxy groups in a molecule and/or the (poly)hydroxy(poly)mercapto compound having one or more hydroxy groups and one or more thiol groups are respectively taken as A and B, and the mole number of the thiol group in the (C) polythiol compound which may have one or more (poly)sulfide bonds in a molecule is taken as C;

[4] the polymerizable composition as set forth in [3], wherein the (C) polythiol compound which may have one or more (poly) sulfide bonds in a molecule contains at least one of 4-mercaptomethyl-1,8-dimercapto-3,6-dithiaoctane, 2,5-bismercaptomethyl-1,4-dithiane, bis(mercaptoethyl)sulfide, 1,1,3,3-tetrakis(mercaptomethylthio)propane, 4,8-dimercaptomethyl-1,11-dimercapto-3,6,9-trithiaundecane, 5,7-dimercaptomethyl-1,11-dimercapto-3,6,9-trithiaundecane and 4,7-dimercaptomethyl-1,11-dimercapto-3,6,9-trithiaundecane;

[5] the polymerizable composition as set forth in [3] or [4], wherein the (D) polyhydroxy compound having two or more hydroxy groups in a molecule and/or the (poly)hydroxy(poly)mercapto compound having one or more hydroxy groups and one or more thiol groups contains at least one of 2-mercaptoethanol, 3-mercapto-1,2-propanediol, pyrogallol, ethylene glycol and polycaprolactonediol;

[6] the polymerizable composition as set forth in [5], wherein the (A) is an alicyclic isocyanate compound represented by the following formula (6) and/or the above formula (2),

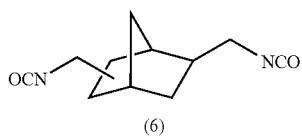

[Chem. 7]

(6)

the (B) is at least one isocyanate compound selected from a group of compounds consisting of the above formula (3) (m=6), the above formula (4) (p=6) and the above formula (5) (q=6), the (C) polythiol compound which may have one or more (poly)sulfide bonds in a molecule is at least one of 4-mercaptomethyl-1,8-dimercapto-3,6-dithiaoctane, 4,8-dimercaptomethyl-1,11-dimercapto-3,6,9-trithiaundecane, 5,7-dimercaptomethyl-1,11-dimercapto-3,6,9-trithiaundecane and 4,7-dimercaptomethyl-1,11-dimercapto-3,6,9-trithiaundecane, and the (D) polyhydroxy compound having two or more hydroxy groups in a molecule and/or the (poly)hydroxy(poly)mercapto compound having one or more hydroxy groups and one or more thiol groups is 2-mercaptoethanol;

[7] a method for producing a resin, wherein the polymerizable composition as set forth in any one of [1] to [6] is polymerized;

[8] a resin obtained by polymerizing the polymerizable composition as set forth in any one of [1] to [6];

[9] an optical component consisting of the resin as set forth in [8];

[10] a lens consisting of the optical component as set forth in [9];

[11] a spectacle lens consisting of the lens as set forth in [10];

[12] use of the polymerizable composition as set froth in any one of [1] to [6] as an optical component; and

[13] use of the resin obtained by polymerizing the polymerizable composition as set forth in any one of [1] to [6] as an optical component.

BEST MODE FOR CARRYING OUT THE INVENTION

The polymerizable composition of the present invention contains the following components, (A) an alicyclic isocyanate compound represented by the following formula (1) and/or the following formula (2),

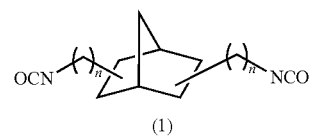

[Chem. 8]

(1)

(in the formula (1), n represents an integer equal to or larger than 0 and equal to or smaller than 3)

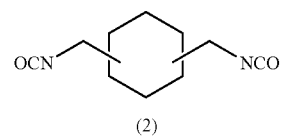

[Chem. 9]

(2)

(B) an isocyanate compound containing at least one selected from a group of compounds consisting of the following formula (3), the following formula (4) and the following formula (5), [Chem. 10]

$OCN-(CH_2)_m-NCO$ (3)

(in the formula (3), m represents an integer equal to or larger than 2 and equal to or smaller than 10)

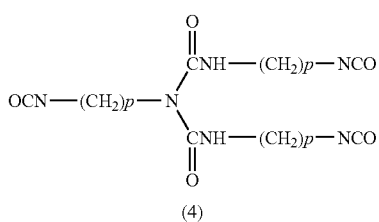

(4)

(in the formula (4), p represents an integer equal to or larger than 2 and equal to or smaller than 10)

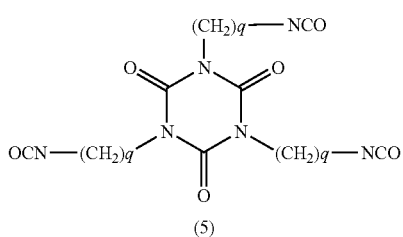

(5)

(in the formula (5), q represents an integer equal to or larger than 2 and equal to or smaller than 10)

(C) at least one polythiol compound which may have one or more (poly)sulfide bonds in a molecule, and (D) at least one polyhydroxy compound having two or more hydroxy groups in a molecule and/or at least one (poly)hydroxy(poly)mercapto compound having one or more hydroxy groups and one or more thiol groups.

Furthermore, the resin of the present invention is obtained by polymerizing the aforementioned polymerizable composition.

Further specifically, the polythiourethane resin of the present invention can be produced by mixing and polymerizing the polymerizable composition containing (A) an alicyclic isocyanate compound represented by the above formula (1) and/or the formula (2), (B) an isocyanate compound containing at least one selected from a group of compounds consisting of the above formula (3), the above formula (4) and the above formula (5), (C) at least one polythiol compound which may have one or more (poly)sulfide bonds in a molecule, and (D) at least one polyhydroxy compound having two or more hydroxy groups in a molecule and/or at least one (poly)hydroxy(poly)mercapto compound having one or more hydroxy groups and one or more thiol groups.

A method for producing the polythiourethane resin of the present invention and the polythiourethane resin obtained by this method are excellent in tintability, and has sufficient resin strength, as compared to conventional resins.

Next, the polymerizable composition in the present invention will be described in detail by referring to concrete examples, but the present invention is not restricted to the compounds as exemplified below. Furthermore, in each component of the present invention, exemplified compounds may be used singly or a plurality of the compounds may be used in combination.

First, the isocyanate compound according to the present invention will be described.

Examples of the alicyclic isocyanate compound represented by the above formula (1) include 2,5-bis(isocyanate)-bicyclo[2,2,1]heptane, 2,6-bis(isocyanate)-bicyclo[2,2,1]heptane, 2,5-bis(isocyanatomethyl)-bicyclo[2,2,1]heptane, 2,6-bis(isocyanatomethyl)-bicyclo[2,2,1]heptane, 2,5-bis(isocyanatoethyl)-bicyclo[2,2,1]heptane, 2,6-bis(isocyanatoethyl)-bicyclo[2,2,1]heptane and the like. Of these compounds, one or two or more kinds can be used.

More specifically, as the alicyclic isocyanate compound represented by the above formula (1), 2,5(6)-bis(isocyanatomethyl)-bicyclo[2,2,1]heptane represented by the following formula (6) can be used.

Herein, 2,5(6)-bis(isocyanatomethyl)-bicyclo[2,2,1]heptane contains at least any one of 2,5-bis(isocyanatomethyl)-bicyclo[2,2,1]heptane and 2,6-bis(isocyanatomethyl)-bicyclo[2,2,1]heptane, and may concretely contain any one of the following (i) to (iii), (i) a single product of 2,5-bis(isocyanatomethyl)-bicyclo[2,2,1]heptane (ii) a single product of 2,6-bis(isocyanatomethyl)-bicyclo[2,2,1]heptane, and (iii) a mixture of 2,5-bis(isocyanatomethyl)-bicyclo[2,2,1]heptane and 2,6-bis(isocyanatomethyl)-bicyclo[2,2,1]heptane.

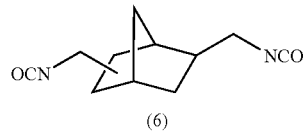

(6)

Furthermore, examples of the alicyclic isocyanate compound represented by the above formula (2) include 1,2-bis(isocyanatomethyl)cyclohexane, 1,3-bis(isocyanatomethyl)cyclohexane, 1,4-bis(isocyanatomethyl)cyclohexane and the like. Of these compounds, one or two or more kinds can be used.

Examples of the isocyanate compound represented by the above formula (3) include 1,2-ethylene diisocyanate, 1,3-propylene diisocyanate, 1,4-butylene diisocyanate, 1,6-hexamethylene diisocyanate, 1,7-heptamethylene diisocyanate, 1,8-octamethylene diisocyanate, 1,9-nonamethylene diisocyanate, 1,10-decamethylene diisocyanate and the like. Of these compounds, one or two or more kinds can be used.

The compounds represented by the above formula (4) and the above formula (5) can be easily obtained by using the compound represented by the above formula (3) as a raw material. The obtained compound may be purified, prior to use, or may be mixed with the compound in the above formula (3) that is a raw material monomer. Furthermore, other isocyanate compounds may be contained.

Next, components (C) and (D) will be described.

Examples of (C) the polythiol compound which may have one or more (poly)sulfide bonds in a molecule include aliphatic polythiol compounds such as methanedithiol, 1,2-ethanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 4-mercaptomethyl-1,8-dimercapto-3,6-dithiaoctane, 4,8-dimercaptomethyl-1,11-dimercapto-3,6,9-trithiaundecane, 5,7-dimercaptomethyl-1,11-dimercapto-3,6,9-trithiaundecane, 4,7-dimercaptomethyl-1,11-dimercapto-3,6,9-trithiaundecane, tetrakis(mercaptomethyl)methane, 1,1,3,3-tetrakis(mercaptomethylthio)propane, 1,1,2,2-tetrakis(mercaptomethylthio)ethane, 1,1,5,5-tetrakis (mercaptomethylthio)-3-thiapentane, 1,1,6,6-tetrakis (mercaptomethylthio)-3,4-dithiahexane, 2,2-bis (mercaptomethyl)-1,3-propanedithiol and the like; aliphatic polythiol compounds having a (poly) sulfide bond such as bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptopropyl)disulfide, bis(mercaptomethylthio)methane, tris(mercaptomethylthio) methane, bis(mercaptoethylthio)methane, tris (mercaptoethylthio)methane, bis(mercaptopropylthio) methane, 1,2-bis(mercaptomethylthio)ethane, 1,2-bis (mercaptoethylthio)ethane, 1,3-bis(mercaptopropylthio) ethane, 1,3-bis(mercaptomethylthio)propane, 1,3-bis (mercaptoethylthio)propane, 1,3-bis(mercaptopropylthio) propane, 1,2,3-tris(mercaptomethylthio)propane, 1,2,3-tris (mercaptoethylthio)propane, 1,2,3-tris(mercaptopropylthio) propane, tetrakis(mercaptomethylthio)methane, tetrakis (mercaptoethylthiomethyl)methane, tetrakis (mercaptopropylthiomethyl)methane, 2,5-dimercapto-1,4-dithiane, 2,5-bismercaptomethyl-1,4-dithiane and the like;

aliphatic polythiol compounds having an ester bond such as ethylene glycol bis(2-mercaptoacetate), ethylene glycol bis(3-mercaptopropionate), diethylene glycol (2-mercaptoacetate), diethylene glycol (3-mercaptopropionate), 2,3-dimercapto-1-propanol(3-mercaptopropionate), 3-mercapto-1,2-propanediol bis(2-mercaptoacetate), 3-mercapto-1,2-propanediol di(3-mercaptopropionate), trimethylolpropane tris(2-mercaptoacetate), trimethylolpropane(3-mercaptopropionate), trimethylolethane tris(2-mercaptoacetate), trimethylolethane tris(3-mercaptopropionate), pentaerythritol tetrakis(2-mercaptoacetate), pentaerythritol (3-mercaptopropionate), glycerine tris(2-mercaptoacetate), glycerine tris(3-mercaptopropionate), 1,4-cyclohexanediol bis(2-mercaptoacetate), 1,4-cyclohexanediol bis(3-mercaptopropionate), hydroxymethylsulfide bis(2-mercaptoacetate), hydroxymethylsulfide bis(3-mercaptopropionate), hydroxyethylsulfide (2-mercaptoacetate), hydroxyethylsulfide(3-mercaptopropionate), hydroxymethyldisulfide(2-mercaptoacetate), hydroxymethyldisulfide(3-mercaptopropionate), thioglycolic acid bis(2-mercaptoethyl ester), thiodipropionic acid bis(2-mercaptoethyl ester) and the like; and compounds having an aromatic ring such as 1,2-dimercaptobenzene, 1,3-dimercaptobenzene, 1,4-dimercaptobenzene, 1,2-bis(mercaptomethyl)benzene, 1,4-bis(mercaptomethyl) benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris (mercaptomethyl)benzene, 1,2,4-tris(mercaptomethyl) benzene, 1,3,5-tris(mercaptomethyl)benzene, 1,2,3-tris (mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2, 3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis (mercaptoethyl)benzene, 1,2,3,5-tetrakis(mercaptoethyl) benzene, 1,2,4,5-tetrakis(mercaptoethyl)benzene, 2,2'-dimercaptobiphenyl, 4,4'-dimercaptobiphenyl and the like. One or two or more kinds of these compounds can be used.

It is further preferable that (C) the polythiol compound which may have one or more (poly)sulfide bonds in a molecule of these compounds may be of a construction containing at least one of 4-mercaptomethyl-1,8-dimercapto-3,6-dithiaoctane, 2,5-bismercaptomethyl-1,4-dithiane, bis (mercaptoethyl)sulfide, 1,1,3,3-tetrakis (mercaptomethylthio)propane, 4,8-dimercaptomethyl-1,11-dimercapto-3,6,9-trithiaundecane, 5,7-dimercaptomethyl-1, 11-dimercapto-3,6,9-trithiaundecane and 4,7-dimercaptomethyl-1,11-dimercapto-3,6,9-trithiaundecane.

Meanwhile, examples of the polyhydroxy compound having two or more hydroxy groups in a molecule of (D) the polyhydroxy compound having two or more hydroxy groups in a molecule and/or the (poly)hydroxy(poly)mercapto compound having one or more hydroxy groups and one or more thiol groups include ethylene glycol, 1,3-propanediol, 1,4-butanediol, 1,5-pentanediol, 1,6-hexanediol, diethylene glycol, propylene glycol, dipropylene glycol, triethylene glycol, butylene glycol, glycerine, trimethylol ethane, trimethylol propane, pentaerythritol, sorbitol, erythritol, xylitol, mannitol, polycaprolactonediol, polyethylene glycol, bisphenol A, bisphenol F, bisphenol A-bis(2-hydroxyethyl ether), tetrabromobisphenol A, tetrabromophenol A-bis(2-hydroxyethyl ether), pyrogallol and the like. However, the present invention is not restricted only to these exemplified compounds. These compounds may be used singly or in combination of two or more kinds thereof.

Furthermore, examples of the (poly)hydroxy(poly)mercapto compound having one or more hydroxy groups and one or more thiol groups of (D) the polyhydroxy compound having two or more hydroxy groups in a molecule and/or the (poly)hydroxy(poly)mercapto compound having one or more hydroxy groups and one or more thiol groups include aliphatic compounds such as 2-mercaptoethanol, 3-mercapto-1, 2-propanedithiol, 1,3-dimercapto-2-propanol, 2,3-dimercapto-1-propanol, 1,2-dimercapto-1,3-butanediol and the like; (poly)hydroxy(poly)mercapto compounds having an ester group such as pentaerythritol mono(3-mercaptopropionate), pentaerythritol bis(3-mercaptopropionate), pentaerythritol tris(3-mercaptopropionate) and the like; and (poly)hydroxy(poly)mercapto compounds having an aromatic ring such as 4-mercaptophenol, 2,4-dimercaptophenol and the like. One or two or more kinds thereof can be used.

More concretely, it is preferable that (D) the polyhydroxy compound having two or more hydroxy groups in a molecule and/or the (poly)hydroxy(poly)mercapto compound having one or more hydroxy groups and one or more thiol groups is of a construction containing at least one of 2-mercaptoethanol, 3-mercapto-1,2-propanediol, pyrogallol, ethylene glycol and polycaprolactonediol.

As the proportion of the alicyclic isocyanate compound represented by the above formula (1) and/or the above formula (2), at least one isocyanate compound selected from a group of compounds of the above formula (3), the above formula (4) or the above formula (5), the polythiol compound which may have one or more (poly) sulfide bonds in a molecule, the polyhydroxy compound having two or more hydroxy groups in a molecule, and/or the (poly)hydroxy (poly)mercapto compound having one or more hydroxy groups and one or more thiol groups, the molar ratio of the NCO/(SH+OH) functional group is usually in the range of 0.5 to 3.0, preferably in the range of 0.5 to 1.5, and particularly preferably in the range of 0.8 to 1.2.

The polymerizable composition of the present invention can be, for example, of the following construction: (A) is an alicyclic isocyanate compound represented by the following formula (6) and/or the above formula (2);

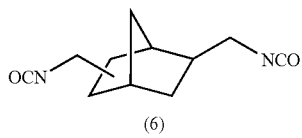

(6)

(B) is at least one isocyanate compound selected from a group of compounds consisting of the above formula (3) (m=6), the above formula (4) (p=6) and the above formula (5) (q=6);

and containing (C) at least one polythiol compound which may have one or more (poly)sulfide bonds in a molecule; and (D) at least one polyhydroxy compound having two or more hydroxy groups in a molecule and/or at least one (poly) hydroxy(poly)mercapto compound having one or more hydroxy groups and one or more thiol groups.

Furthermore, the polymerizable composition of the present invention may be of a construction containing the following components: containing an alicyclic isocyanate compound represented by the above formula (6) and/or the above formula (2); and at least one isocyanate compound selected from a group of compounds consisting of the above formula (3) (m=6), the above formula (4) (p=6) and the above formula (5) (q=6);

wherein (C) the polythiol compound which may have one or more (poly)sulfide bonds in a molecule is at least one of 4-mercaptomethyl-1,8-dimercapto-3,6-dithiaoctane, 4,8-dimercaptomethyl-1,11-dimercapto-3,6,9-trithiaundecane, 5,7-dimercaptomethyl-1,11-dimercapto-3,6,9-trithiaundecane and 4,7-dimercaptomethyl-1,11-dimercapto-3,6,9-trithiaundecane;

while (D) the polyhydroxy compound having two or more hydroxy groups in a molecule and/or the (poly)hydroxy(poly)mercapto compound having one or more hydroxy groups and one or more thiol groups is 2-mercaptoethanol.

Meanwhile, of the compounds as cited above, when 2,5(6)-bis(isocyanatomethyl)-bicyclo[2,2,1]heptane as an alicyclic isocyanate compound represented by the above formula (1), 1,6-hexamethylene diisocyanate as a compound represented by the above formula (3), 4-mercaptomethyl-1,8-dimercapto-3,6-dithiaoctane as (C) a polythiol compound which may have one or more (poly) sulfide bonds in a molecule and 2-mercaptoethanol as (D) a polyhydroxy compound having two or more hydroxy groups in a molecule and/or a (poly) hydroxy(poly)mercapto compound having one or more hydroxy groups and one or more thiol groups are used in combination thereof, a resin obtainable by polymerizing these compounds is excellent in tintability and resin strength, and results in sufficiently satisfying refractive index, Abbe's number and heat resistance.

Further, (D) the polyhydroxy compound having two or more hydroxy groups in a molecule and/or the (poly)hydroxy(poly)mercapto compound having one or more hydroxy groups and one or more thiol groups is a compound containing a hydroxy group in a molecular structure.

When the mole numbers of the hydroxy group and the thiol group in (D) the polyhydroxy compound having two or more hydroxy groups in a molecule and/or the (poly)hydroxy(poly)mercapto compound having one or more hydroxy groups and one or more thiol groups are respectively taken as A and B, and the mole number of the thiol group in (C) the polythiol compound which may have one or more (poly)sulfide bonds in a molecule is taken as C, as for the upper limit of the content of the hydroxy group, $100 \times A/(A+B+C)$ (%) is, for example, not more than 40%, preferably not more than 35%, and further preferably not more than 30%. In this manner, a resin particularly excellent in the balance between tintability and resin strength is obtained.

Meanwhile, the lower limit of the content of the hydroxy group is not particularly limited, but the value of the above $100 \times A/(A+B+C)$ (%) can be, for example, not less than 0.1%, preferably not less than 3.0% and further preferably not less than 5.0%.

A resin modifier can be added to the polymerizable composition of the present invention, in order to regulate optical physical properties such as refractive index, specific gravity and the like, impact resistance of the obtained resin, the viscosity of the polymerizable composition, and the like.

Furthermore, in curing the polymerizable composition of the present invention by the polymerization, various substances may also be added in the same manner as in a known molding method depending on the purpose. Examples of the substance include a chain extension agent, a crosslinking agent, a light stabilizer, an ultraviolet absorbent, an anti-oxidant, an anti-coloring agent, a blueing agent and the like. Incidentally, the curing method is not particularly limited, but, for example, heat curing or the like can be used.

Furthermore, a known reaction catalyst can be properly added for the purpose of adjusting the desired reaction rate. Examples of the catalyst to be preferably used include tin compounds such as dibutyltin dilaurate, dibutyltin dichloride, dimethyltin dichloride, tetramethyl diacetoxy distannoxane, tetraethyl diacetoxy distannoxane, tetrapropyl diacetoxy distannoxane, tetrabutyl diacetoxy distannoxane and the like; or amine compounds such as a tertiary amine and the like as a urethanization catalyst. These compounds can be used singly or in combination of two or more kinds. The amount of the catalyst added is preferably in the range of 0.001 to 1 weight % based on the total weight of monomers of the composition. This range is preferable because the extent of polymerization is excellent and from the viewpoint of pot life upon compounding, or transparency, optical physical properties or light resistance of the obtained resin.

The polymerizable composition of the present invention is cured by the polymerization. In this manner, the resin of the present invention is obtained. The resin of the present invention is typically obtained by subjecting the above polymerizable composition to a casting polymerization. Concretely, various additives such as a catalyst, an ultraviolet absorbent, an internal release agent and the like are previously mixed with the monomer in use to give a mixed solution. This mixed liquid is degassed according to a proper method as needed, and then poured into a mold composed of two pieces of glass plates, a tape or a gasket for carrying out the polymerization. The pouring viscosity is not particularly limited, but the viscosity of the monomer mixed solution is preferably from 20 to 1000 mPa·s. The polymerization conditions at the time of polymerization cannot be restricted since the conditions are greatly different depending on the type of the monomer, the type of the catalyst, the amount thereof, the shape of the mold in use and the like. But, a thermal polymerization is usually carried out at a temperature of from −20 degrees centigrade to 200 degrees centigrade over 1 to 100 hours.

The polythiourethane resin of the present invention mainly contains a urethane bond and/or a thiocarbamic acid S-alkyl ester bond by an isocyanate group and a hydroxy group and/or a thiol group. However, in addition thereto, it may further contain an allophanate bond, a urea bond or a biuret bond depending on the purpose. For example, the crosslinking density is increased by further reacting a urethane bond or a thiocarbamic acid S-alkyl ester bond with an isocyanate group. Such increased crosslinking density might bring about desirable results in many cases. In this case, the reaction temperature is increased to at least not lower than 100 degrees centigrade, an isocyanate component is also used in large quantities. Or, amine or the like is partly used together, and a urea bond and a biuret bond can also be employed. When a compound other than a polyol compound reacting with an isocyanate compound, a polythiol compound and a thiol compound having a hydroxy group is employed, there is particularly a need to pay attention to the coloring.

According to the present invention, it was found that the polythiourethane resin obtainable by polymerizing the polymerizable composition containing at least one of a polyisocyanate compound to be suitably used for transparent resin materials, (C) at least one polythiol compound which may have one or more (poly)sulfide bonds in a molecule, and (D) at least one polyhydroxy compound having two or more hydroxy groups in a molecule and/or at least one (poly)hydroxy(poly)mercapto compound having one or more hydroxy groups and one or more thiol groups is excellent in tintability and resin strength, as compared to conventional resins, and has performance satisfying all of the refractive index, Abbe's number and heat resistance.

For this reason, the thus-obtained polythiourethane resin of the present invention is colorless and transparent, and also excellent in optical physical properties so that it is suitably used as an optical component or an optical element material of lens such as a spectacle lens or the like, a prism, a camera lens, an optical fiber, an information recording plate, a filter, a light emitting diode and the like.

For example, according to the present invention, a composition and a resin which are excellent in tintability and resin strength as compared to conventional resins for lenses and provide a resin for a lens satisfying all of the refractive index, Abbe's number and heat resistance are obtainable.

Furthermore, according to the present invention, as an optical material in the field using high refractive index materials, a transparent curable resin excellent in tintability and resin strength is obtained. In particular, a material suitable in the field of optical components including lenses such as a spectacle lens and the like is obtained.

Incidentally, in order to improve anti-reflection, high hardness grant, wear resistance improvement, improvement of chemical resistance, anti-fogging property grant, fashionability grant or the like, the polythiourethane lens of the present invention can be subjected to physical or chemical processes such as surface polishing, antistatic process, hard coating process, non-reflective coating process, tinting process, photochromic process and the like as needed. A water bath with a disperse dye dispersed therein is usually used for tinting. However, in order to improve the tinting rate and the tinting concentration, a tinting bath with a carrier represented by benzyl alcohol added thereto may also be used.

EXAMPLES

The present invention is now illustrated in detail below with reference to Examples. Incidentally, of performance tests of the obtained resin, a reflective index, specific gravity, heat resistance, resin strength and tintability were respectively evaluated in the following manner.

Refractive index (ne) and Abbe's number (ve): They were measured at 20 degrees centigrade using a Pulfrich refractometer.

Specific gravity: It was measured according to the Archimedian method.

Heat resistance: Tg (° C.) measured by TMA (Thermo Mechanical Analysis) penetration method (a load of 50 g, a pinpoint of 0.5 mmΦ, a heating rate of 10 degrees centigrade/min) was take as the heat resistance.

Resin strength: A resin strip with a polythiourethane resin processed into a dumbbell shape having a thickness of 3 mm, a length of 85 mm and a width of 5 mm using AUTOGRAPH AGS-J (a product of Shimadzu Corporation) was employed. At a temperature of 20 degrees centigrade, the test strip was applied a load at a tensile speed of from 1 mm/min to 5 mm/min. At that time, its maximum load (N/mm$^2$) was calculated.

Tintability: To 995 g of pure water were added 1.5 g of a disperse dye for a spectacle lens [MLP-Blue], 2.0 g of [MLP-Yellow] and 1.5 g of [MLP-Red] (products of Miike Dyes Works Ltd.) as a tinting agent to adjust a dye dispersion. The resulting mixture was heated to 90 degrees centigrade and then a plastic lens piece having a thickness of 9 mm was immersed therein at 90 degrees centigrade for 5 minutes for tinting. The lens piece after being tinted was scanned at a wavelength of 400 to 800 nm to measure the transmittance (% T) at 565 nm.

Example 1

50.31 g of 2,5(6)-bis(isocyanatomethyl)-bicyclo[2,2,1]heptane, 10.26 g of 1,6-hexamethylene diisocyanate, 11.91 g of 2-mercaptoethanol, 27.52 g of 4-mercaptomethyl-1,8-dimercapto-3,6-dithiaoctane, 0.25 g of Zelec UN (an internal release agent) and 0.05 g of Viosorb 583 (an ultraviolet absorbent) were mixed and dissolved at 20 degrees centigrade. 0.15 g of dibutyltin dichloride was added thereto as a curing catalyst to give a uniform solution.

The uniform solution was degassed at 600 Pa for 1 hour, filtered using a 1 μm Teflon (registered trademark) filter and poured into a mold frame composed of a glass mold and a tape. The mold frame was put in an oven, subjected to a temperature elevation slowly from 25 to 120 degrees centigrade for polymerizing over 20 hours. After the polymerization was completed, the mold frame was taken out of the oven, and released therefrom to obtain a resin. The obtained resin was further subjected to an annealing process at 120 degrees centigrade for 4 hours.

The obtained resin was excellent such that it was colorless and has high transparency. The refractive index (ne) thereof was 1.597 and Abbe's number (ve) was 41.

Examples 2 to 7

Lenses were prepared with compositions in Table 1 in the same manner as in Example 1. The evaluation results are shown in Table 2. An internal release agent, an ultraviolet absorbent and a curing catalyst were also used in the same manner.

Comparative Example 1

To 50.6 g of 2,5(6)-bis(isocyanatomethyl)-bicyclo[2,2,1] heptane were mixed 0.13 g of Zelec UN (product name, an internal release agent), 0.05 g of Viosorb 583 (product name, an ultraviolet absorbent), 23.9 g of pentaerythritol tetrakis(3-mercaptopropionate) and 25.5 g of 4-mercaptomethyl-1,8-dimercapto-3,6-dithiaoctane, and the resulting mixture was dissolved. 0.02 g of dibutyltin dichloride as a curing catalyst was added thereto, and the mixed solution was degassed at 600 Pa for 1 hour, filtered using a 1 μm Teflon (registered trademark) filter, and poured into a mold frame composed of a glass mold and a tape.

The mold frame was put in an oven, and subjected to a temperature elevation slowly from 10 to 120 degrees centigrade for polymerizing over 18 hours. After the polymerization was completed, the mold frame was taken out of the oven, and released therefrom to obtain a resin. The obtained resin was further subjected to an annealing process at 120 degrees centigrade for 3 hours.

The obtained resin was excellent such that it was colorless and has high transparency. The refractive index (ne) thereof was 1.598 and Abbe's number (ve) was 41.

TABLE 1

|  |  | Component (A) | | Component (B) | | Component (C) | | Component (D) | | |
|---|---|---|---|---|---|---|---|---|---|---|
|  |  | Type | (mole) | Type | (mole) | Type | (mole) | Type | (mole) | H(%) |
| Example | 1 | (A)-1 | 0.244 | (B)-1 | 0.061 | (C)-1 | 0.106 | (D)-1 | 0.153 | 24.6 |
|  | 2 | (A)-1 | 0.276 | (B)-1 | 0.031 | (C)-1 | 0.095 | (D)-1 | 0.169 | 27.1 |
|  | 3 | (A)-1 | 0.249 | (B)-2 | 0.021 | (C)-1 | 0.115 | (D)-1 | 0.110 | 19.5 |
|  | 4 | (A)-1 | 0.242 | (B)-1 | 0.059 | (C)-2 | 0.076 | (D)-1 | 0.154 | 25.2 |
|  | 5 | (A)-1 | 0.272 | (B)-1 | 0.030 | (C)-2 | 0.065 | (D)-1 | 0.179 | 29.0 |
|  | 6 | (A)-1 | 0.213 | (B)-3 | 0.044 | (C)-1 | 0.092 | (D)-1 | 0.128 | 24.1 |
|  | 7 | (A)-2 | 0.273 | (B)-1 | 0.030 | (C)-2 | 0.082 | (D)-1 | 0.154 | 24.2 |
| Comparative Example 1 | | (A)-1 | 0.245 | | | (C)-1 | 0.098 | | | 0.0 |
| | | | | | | (C)-3 | 0.049 | | | |

Incidentally, Examples 1 to 6 and Comparative Example 1, as 2, 5(6)-bis(isocyanatomethyl)-bicyclo[2,2,1]heptane, a mixture of 2,5-bis(isocyanatomethyl)-bicyclo[2,2,1]heptane and 2,6-bis(isocyanatomethyl)-bicyclo[2,2,1]heptane was used.

Symbols in Table 1 indicate the following.
(A)-1: 2,5(6)-bis(isocyanatomethyl)-bicyclo [2,2,1]heptane
(A)-2: 1,3-bis(isocyanatomethyl)cyclohexane
(B)-1: 1,6-hexamethylene diisocyanate
(B)-2: a compound having p=6 in the above formula (4)
(B)-3: a compound having q=6 in the above formula (5)
(C)-1: 4-mercaptomethyl-1,8-dimercapto-3,6-dithiaoctane (C)-2:

4,8-dimercaptomethyl-1,11-dimercapto-3,6,9-trithiaundecane (C)-3: pentaerythritol tetrakis(3-mercaptopropionate)
(D)-1: 2-mercaptoethanol
H: the proportion (%) of the mole number of the hydroxy group occupied in the total mole numbers of the thiol group and the hydroxy group, 100×A/(A+B+C), when the mole numbers of the hydroxy group and the thiol group in a polyhydroxy compound having two or more hydroxy groups in a molecule and/or a (poly)hydroxy(poly)mercapto compound having one or more hydroxy groups and one or more thiol groups are respectively taken as A and B, and the mole number of the thiol group in a polythiol compound which may have one or more (poly)sulfide bonds in a molecule is taken as C.

TABLE 2

| Examples | Reflective Index (ne) | Abbe's Number (ve) | Heat Resistance (° C.) | Maximum Tensile stress (N/mm²) | Specific Gravity (20° C.) | Tintability (% T565 nm) |
|---|---|---|---|---|---|---|
| Example 1 | 1.597 | 41 | 105 | 96 | 1.28 | 19 |
| Example 2 | 1.594 | 41 | 111 | 101 | 1.28 | 37 |
| Example 3 | 1.599 | 41 | 111 | 92 | 1.28 | 32 |
| Example 4 | 1.594 | 41 | 109 | 93 | 1.29 | 34 |
| Example 5 | 1.594 | 41 | 116 | 104 | 1.29 | 52 |
| Example 6 | 1.587 | 42 | 105 | 92 | 1.27 | 12 |
| Example 7 | 1.596 | 40 | 100 | 101 | 1.28 | 28 |
| Comparative Example 1 | 1.598 | 41 | 117 | 88 | 1.31 | 56 |

From the above results, it was found that the resins of Examples are excellent in tintability and resin strength, as compared to that of the Comparative Example, achieving the balance of the refractive index, Abbe's number, heat resistance and specific gravity.

The invention claimed is:

1. A polymerizable composition containing (A) an alicyclic isocyanate compound represented by the following formula (1) and/or the following formula (2),

(1)

(in the formula (1), n=1)

(2)

wherein the alicyclic isocyanate compound of formula (2) is 1,3-bis(isocyanatomethyl) cyclohexane, (B) an isocyanate compound containing at least one selected from a group of compounds consisting of the following formula (3) and the following formula (4), $$OCN-(CH_2)m\text{-}NCO \quad (3)$$

wherein the compound of formula (3) is selected from the group consisting of 1,2-ethylene diisocyanate, 1,3-propylene diisocyanate, 1,4-butylene diisocyanate, 1,6-hexamethylene diisocyanate, 1,7-heptamethylene diisocyanate, 1,8-octamethylene diisocyanate, 1,9-nonamethylene diisocyanate, and 1,10-decamethylene diisocyanate

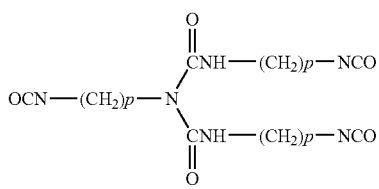

(in the formula (4), p=6)

(C) at least one polythiol compound which may have one or more (poly)sulfide bonds in a molecule, and (D) at least one polyhydroxy compound having two or more hydroxy groups in a molecule and/or at least one (poly)hydroxy(poly)mercapto compound having one or more hydroxy groups and one or more thiol groups, wherein 100×A/(A+B+C) is not less than 0.1% but not more than 30% when the mole numbers of the hydroxy group and the thiol group in said (D) polyhydroxy compound having two or more hydroxy groups in a molecule and/or the (poly)hydroxy(poly)mercapto compound having one or more hydroxy groups and one or more thiol groups are respectively taken as A and B, and the mole number of the thiol group in said (C) polythiol compound which may have one or more (poly)sulfide bonds in a molecule is taken as C, and wherein the mole ratio of the component (B) to the component (A) is equal to or larger than 0.084 and equal to or smaller than 0.25.

2. The polymerizable composition as set forth in claim 1, wherein said (A) is an alicyclic isocyanate compound represented by the following formula (6) and/or said formula (2), and

said (B) is at least one isocyanate compound selected from a group of compounds consisting of said formula (3) (1,6-hexamethylene diisocyanate) and said formula (4) (p=6).

3. The polymerizable composition as set forth in claim 1, wherein said (C) polythiol compound which may have one or more (poly)sulfide bonds in a molecule contains at least one of 4-mercaptomethyl-1,8-dimercapto-3,6-dithiaoctane, 2,5-bismercaptomethyl-1,4-dithiane, bis(mercaptoethyl)sulfide, 1,1,3,3-tetrakis(mercaptomethylthio)propane, 4,8-dimercaptomethyl-1,11-dimercapto-3,6,9-trithiaundecane, 5,7-dimercaptomethyl-1,11-dimercapto-3,6,9-trithiaundecane and 4,7-dimercaptomethyl-1,11-dimercapto-3,6,9-trithiaundecane.

4. The polymerizable composition as set forth in claim 1, wherein said (D) polyhydroxy compound having two or more hydroxy groups in a molecule and/or the (poly)hydroxy(poly)mercapto compound having one or more hydroxy groups and one or more thiol groups contains at least one of 2-mercaptoethanol, 3-mercapto-1,2-propanediol, pyrogallol, ethylene glycol and polycaprolactonediol.

5. The polymerizable composition as set forth in claim 4, wherein said (A) is an alicyclic isocyanate compound represented by the following formula (6) and/or said formula (2),

said (B) is at least one isocyanate compound selected from a group of compounds consisting of said formula (3) (1,6-hexamethylene diisocyanate) and said formula (4) (p=6), said (C) polythiol compound which may have one or more (poly)sulfide bonds in a molecule is at least one of 4-mercaptomethyl-1,8-dimercapto-3,6-dithiaoctane, 4,8-dimercaptomethyl-1,11-dimercapto-3,6,9-trithiaundecane, 5,7-dimercaptomethyl-1,11-dimercapto-3,6,9-trithiaundecane and 4,7-dimercaptomethyl-1,11-dimercapto-3,6,9-trithiaundecane, and said (D) polyhydroxy compound having two or more hydroxy groups in a molecule and/or the (poly)hydroxy(poly)mercapto compound having one or more hydroxy groups and one or more thiol groups is 2-mercaptoethanol.

6. A method for producing a resin, comprising polymerizing the polymerizable composition as set forth in claim 1.

* * * * *